Jan. 12, 1965 A. BROTHMAN ETAL 3,165,733
CODE STACK
Filed July 19, 1961 8 Sheets-Sheet 1
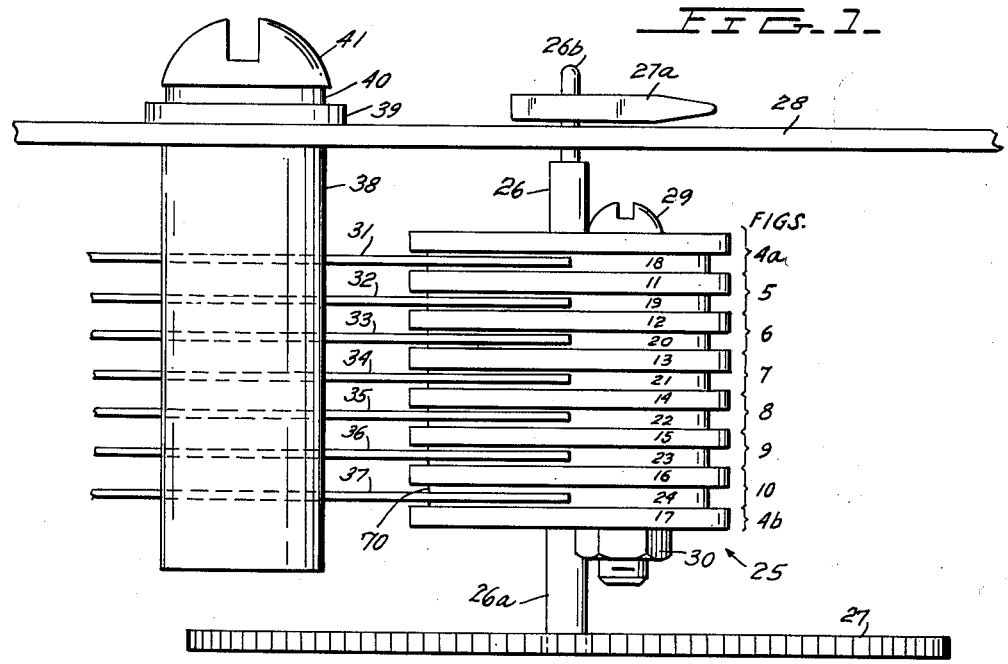
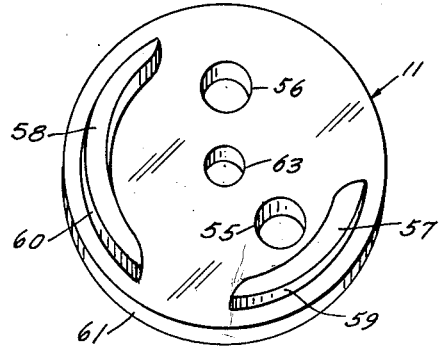
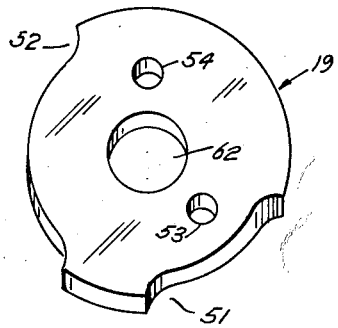
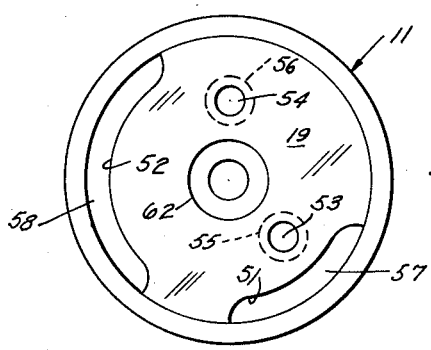
INVENTORS
ABRAHAM BROTHMAN
RICHARD D. REISER
STEPHEN J. HALPERN
BY EDWARD W. LEWISON
PAUL LEWISON
ALFRED LEWISON
OSTROLENK, FABER, GERB & SOFFEN
ATTORNEYS Jan. 12, 1965     A. BROTHMAN ETAL     3,165,733
CODE STACK
Filed July 19, 1961                                                               8 Sheets-Sheet 2
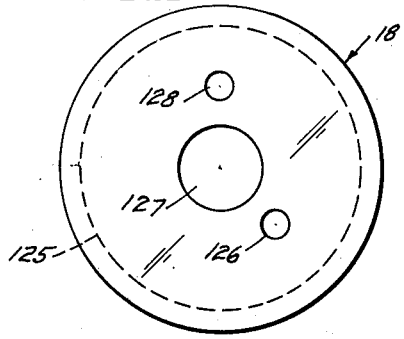
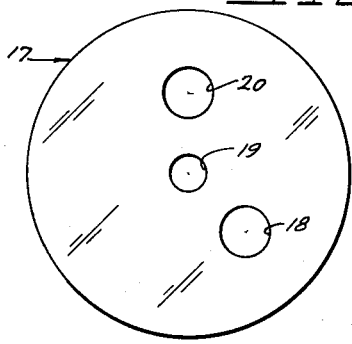
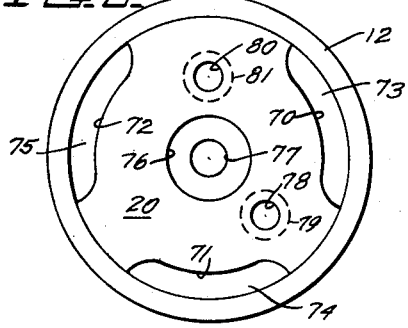
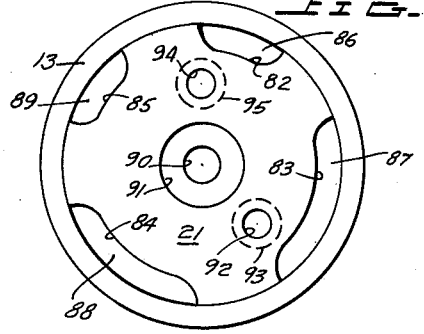
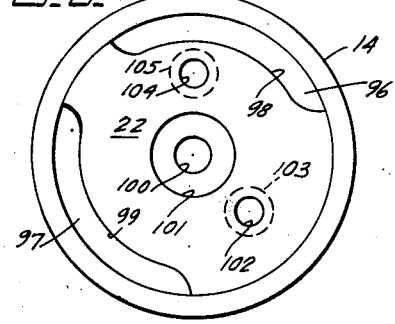
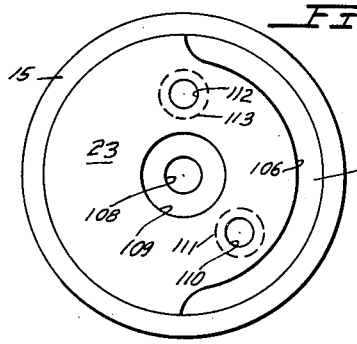
INVENTORS
ABRAHAM BROTHMAN
RICHARD D. REISER
BY STEPHEN J. HALPERN
EDWARD W. LEWISON
PAUL LEWISON
ALFRED LEWISON
OSTROLENK, FABER, GERB & SOFFEN
ATTORNEYS Jan. 12, 1965    A. BROTHMAN ETAL    3,165,733
CODE STACK
Filed July 19, 1961    8 Sheets-Sheet 3
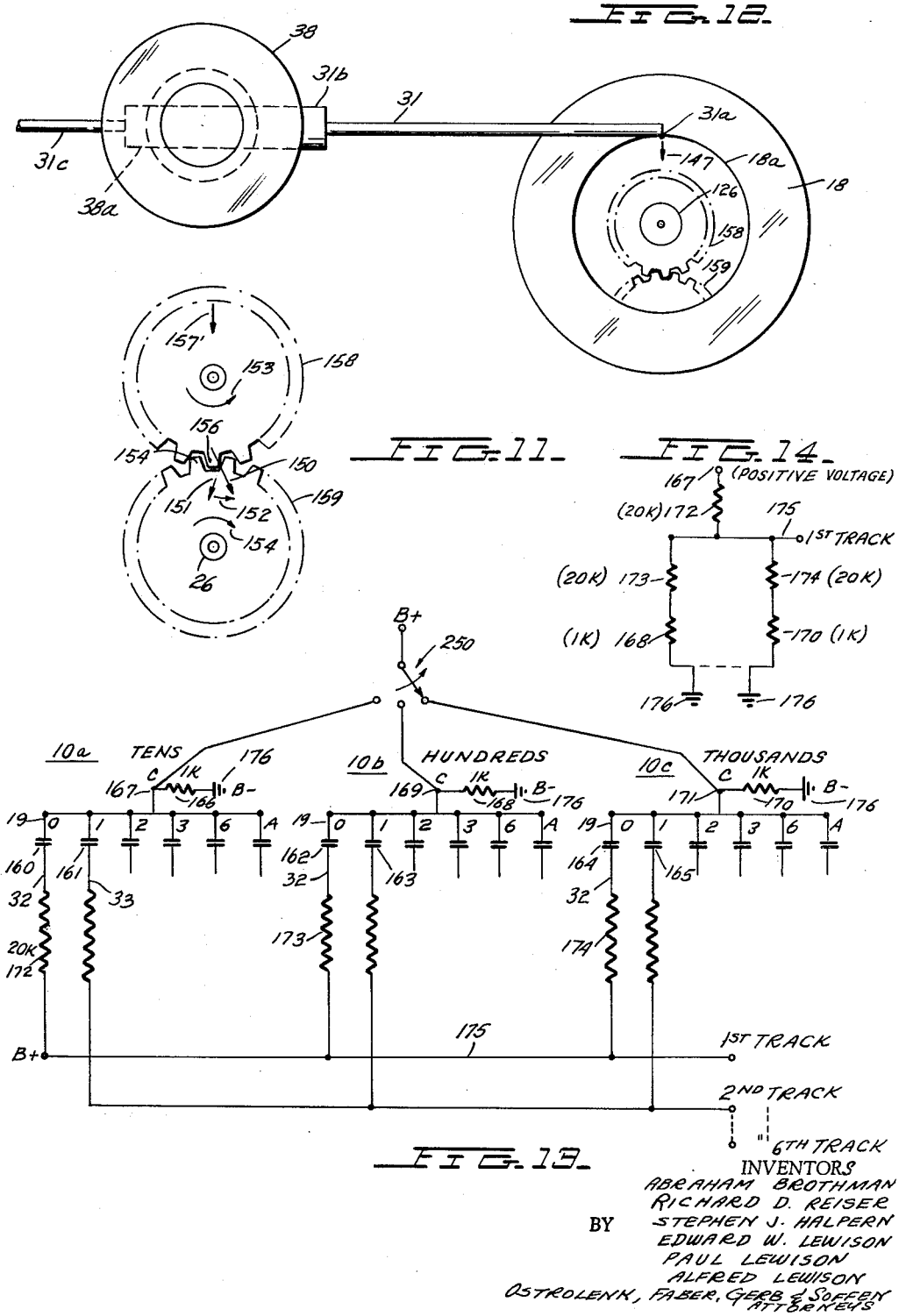
INVENTORS
ABRAHAM BROTHMAN
RICHARD D. REISER
STEPHEN J. HALPERN
BY  EDWARD W. LEWISON
PAUL LEWISON
ALFRED LEWISON
OSTROLENK, FABER, GERB & SOFFEN
ATTORNEYS Jan. 12, 1965   A. BROTHMAN ETAL   3,165,733
CODE STACK
Filed July 19, 1961   8 Sheets-Sheet 4
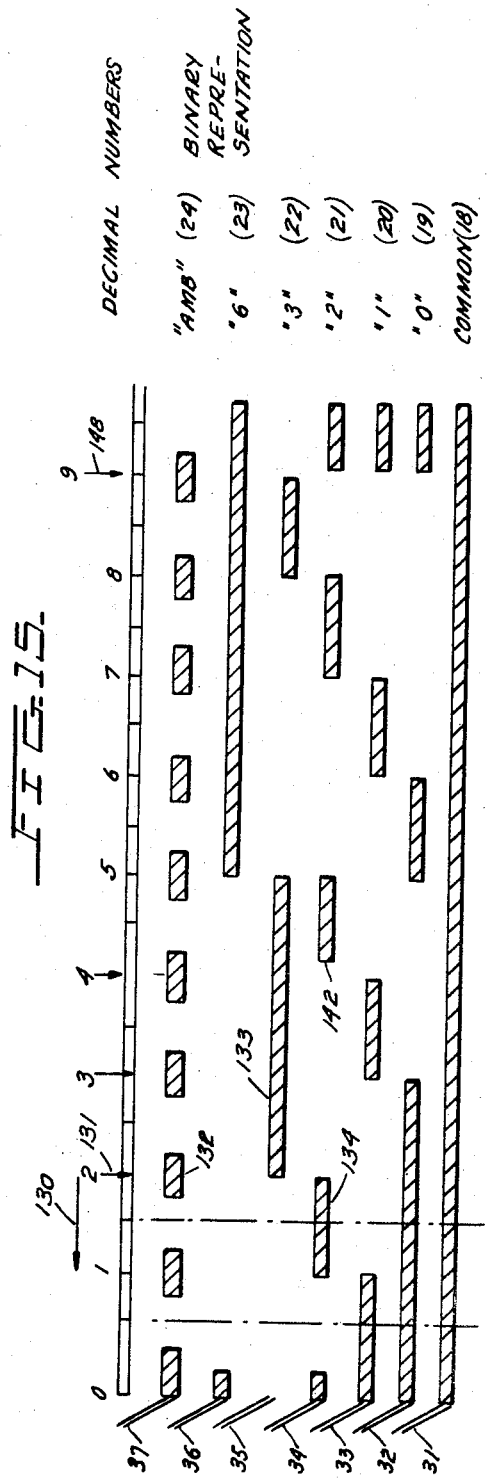
INVENTORS
ABRAHAM BROTHMAN
RICHARD D. REISER
STEPHEN J. HALPERN
EDWARD W. LEWISON
PAUL LEWISON
ALFRED LEWISON
BY
OSTROLENK, FABER, GERB & SOFFEN
ATTORNEYS

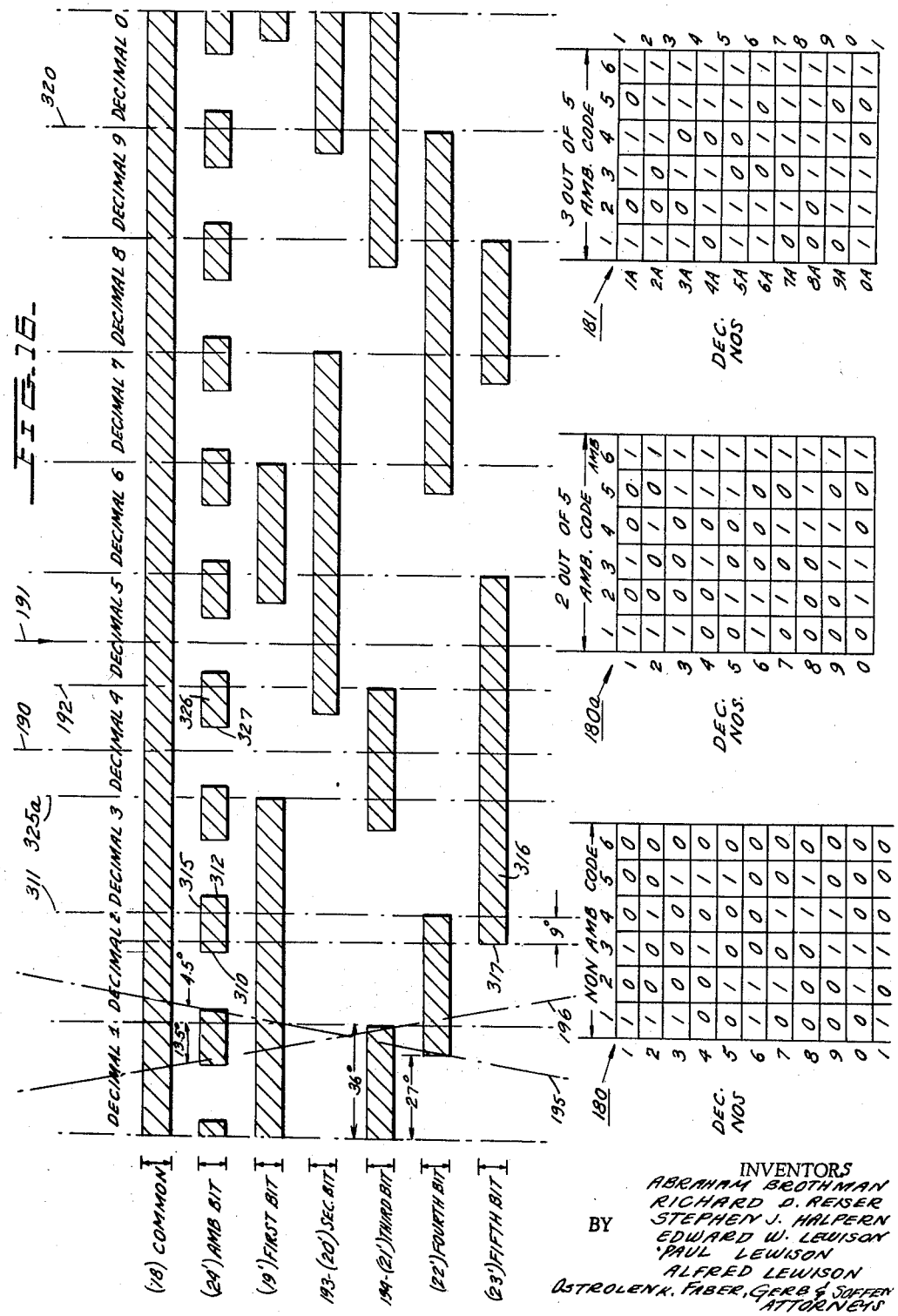

1ST BIT

2ND BIT

3RD BIT

4TH BIT

5TH BIT

"AMB" BIT

INVENTORS
ABRAHAM BROTHMAN
RICHARD D. REISER
STEPHEN J. HALPERN
EDWARD W. LEWISON
PAUL LEWISON
ALFRED LEWISON
BY OSTROLENK, FABER, GERB & SOFFEN
ATTORNEYS

Jan. 12, 1965  A. BROTHMAN ETAL  3,165,733
CODE STACK
Filed July 19, 1961  8 Sheets-Sheet 7
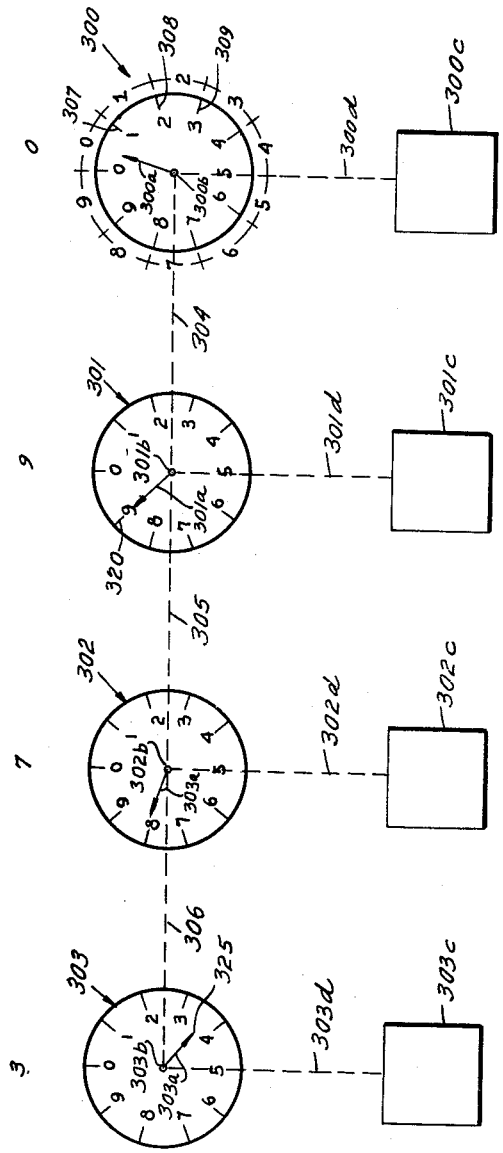
INVENTORS
ABRAHAM BROTHMAN
RICHARD D. REISER
STEPHEN J. HALPERN
BY EDWARD W. LEWISON
PAUL LEWISON
ALFRED LEWISON
OSTROLENK, FABER, GERB & SOFFEN
ATTORNEYS

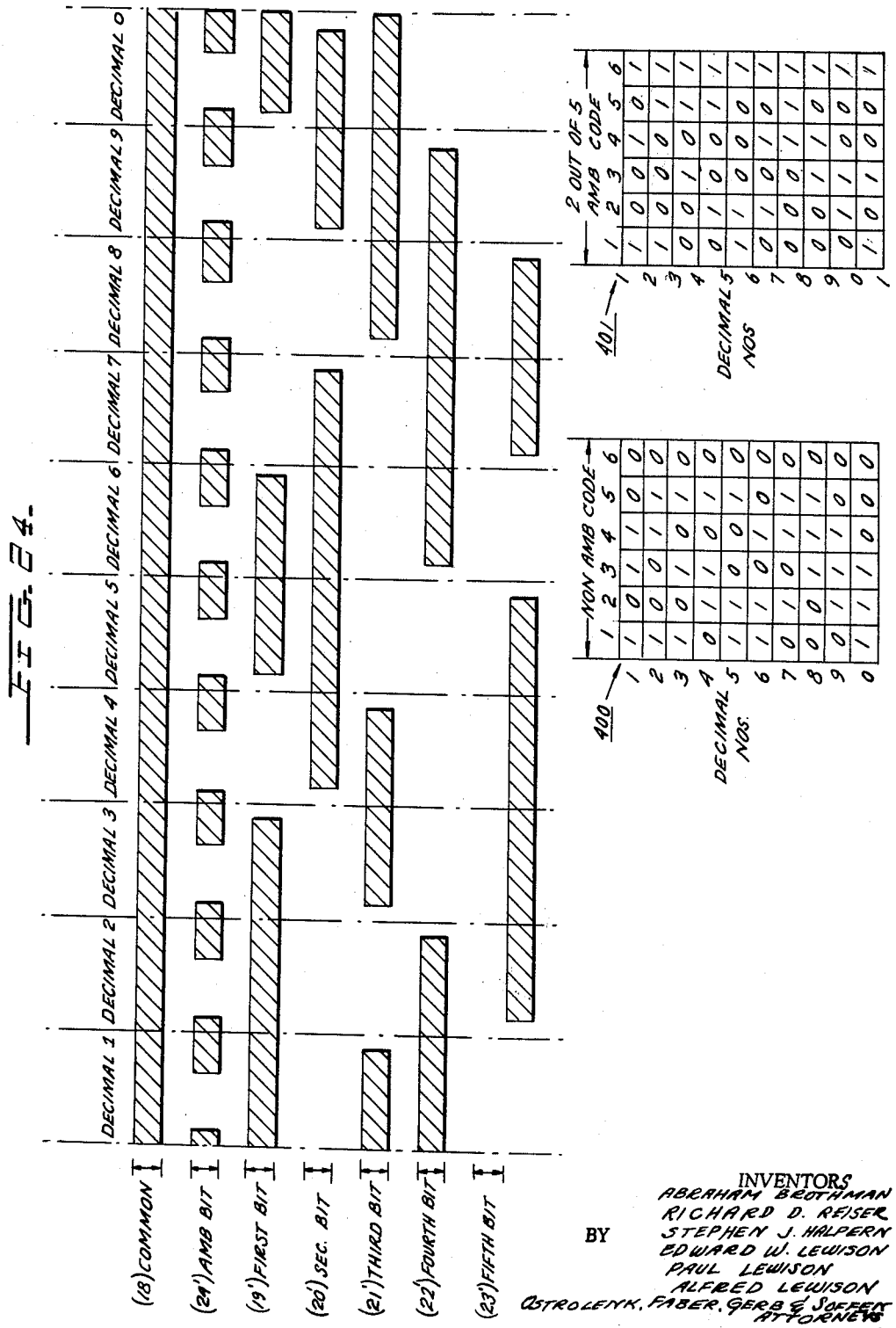

United States Patent Office 3,165,733
Patented Jan. 12, 1965

3,165,733
CODE STACK
Abraham Brothman, Dumont, and Richard D. Reiser, Newark, N.J., Stephen J. Halpern, Forest Hills, N.Y., and Edward W. Lewison, Englewood Cliffs, and Paul Lewison and Alfred Lewison, Deal, N.J., assignors, by mesne assignments, to Transitel International Corp., Paramus, N.J., a corporation of New Jersey
Filed July 19, 1961, Ser. No. 125,247
13 Claims. (Cl. 340—347)

This invention relates to code stacks and more particularly to code stacks for rotatable shaft output devices wherein shaft angle positions are translated into a binary code.

Shaft angle encoders presently in use are usually of the disc or cylinder type wherein the former has its encoding pattern on the flat surface while the latter has its encoding pattern on its curved surface. The shaft encoders are used to give a binary coded representation for each shaft angle position. The shaft encoder is able to provide a high degree of accuracy of conversion from shaft rotation to binary digital code without going through intermediate electronic analog operations. The accuracy of the shaft position encoder is built into the encoder by mechanical means and therefore is not subject to drift or the need for adjustments.

The disc type of shaft angle encoder normally consists of a plurality of circular tracks, one for each binary digit of the digital representation, wherein each track contains a plurality of arcuate segments. The arcuate segments are normally made conductive whereas the area between segments is non-conductive. The brushes used to sense the conducting segments are mounted on a single radial line. The electric circuit through the arcuate segments and the sensing brushes is completed through a common brush and a continuous segment or a ring which is electrically connected to all segments. The dimension of each conductive segment is chosen to correspond to the changes in binary digits in the binary coded representation of each position.

The angular positions which a shaft may assume are infinite in number. This being true there exists the possibility that one of the positions which the shaft may assume is a position at the intersection of two distinct decimal numbers. For example, in a meter designed to read in the decimal system, the dial pointer may assume an angular position on the "hairline" between the position number 1 and the position number 2. The binary representation of the decimal digit on the code wheel is such that ambiguity arises at the exact position at which the dial indicator is moving from the decimal number 1 to the decimal number 2. That is, at this point, at least one of the sensing brushes is making the transition from an insulated portion of the code wheel to a conductive segment. Unless the dimensional tolerances on the segments and brushes are reduced to absolute zero, the transition from conductive segment to insulated portion on the disc will not be sharp. Although this occurrence is not serious with regard to the track on the disc which represents the least significant binary digit, the problem does become a serious one when the two outputs are not immediately adjacent one another with regard to their chronological order. For example, in a case where the shaft encoder has four tracks each representing a binary digit and the disc is rotated from the position which represents the decimal number 9 to the position which represents the decimal number zero. Letting the number "1" represent a binary one and "0" represent a binary zero, the binary representation for the decimal number 9 is 1001 while the binary representation for the decimal number 0 is 0000. It can be seen here that the most significant and the least binary digit positions are changing simultaneously.

If for example, at the midway point between decimal 9 and decimal 0 with the track which represents the decimal number 8 remains in contact with its conductive segment for a longer period than does the sensing brush for decimal 1 position due to the practical limitations of sensing brush alignment, then the binary representation will be 1000 which represents the decimal number 8 which does not represent a position midway between 9 and 0. Thus it can be seen that the ambiguity need not be limited to the least significant digit, but may occur along any track of the binary representation.

To better illustrate this phenomena, consider for example, the binary coded decimal with an even parity bit. In this system, the decimal numbers 0 through 9 are represented as in Table 1, with the parity bit position being in Binary "1" state in those decimal numbers whose binary representation contains an odd number of binary 1 bits. In those decimal numbers whose binary representation contains an even number of binary "1" bits the parity will be in binary "0" state. From Table 1 we see that the code for decimal number 3 is 00011, while the code for binary 4 is 10100. Due to misalignment of the code stack and/or the sensing brushes, as the code stack transfers from decimal position 3 to decimal 4, for example, the sensing brush of the binary 1 bit position and that of the 4 bit position may lead the other sensing brushes; they may, therefore, arrive at the arcuate portion of the code stack which represents decimal 4 while the other three brushes remain on that portion of the code stack which represents decimal 3. The resulting code will be 00110 which is a correct code for the decimal 6 and will pass all parity checks. Thus it can be seen that the ambiguity problem must be solved in encoding devices of the above-mentioned type before any degree of accuracy can be obtained.

Table 1

| Parity | 8 | 4 | 2 | 1 | Decimal value |
|---|---|---|---|---|---|
| 1 | 0 | 0 | 0 | 1 | 1 |
| 1 | 0 | 0 | 1 | 0 | 2 |
| 0 | 0 | 0 | 1 | 1 | 3 |
| 1 | 0 | 1 | 0 | 0 | 4 |
| 0 | 0 | 1 | 0 | 1 | 5 |
| 0 | 0 | 1 | 1 | 0 | 6 |
| 1 | 0 | 1 | 1 | 1 | 7 |
| 1 | 1 | 0 | 0 | 0 | 8 |
| 0 | 1 | 0 | 0 | 1 | 9 |
| 0 | 1 | 0 | 1 | 0 | 0 |

One method of avoiding such an ambiguity is to design the encoder so that readings are taken only when the brushes are centered over conductive segments. This may be done by providing an extra set of segments and a brush wherein the extra segments have dimensions and positions wherein good electrical contact occurs only at the central region of the conductive segments. Failure of the extra brush to make electrical contact with these extra segments completely inhibits the reading. This method has the disadvantage of failing to produce coded representation of all "halfway" positions of the brush arm thereby preventing the encoder's use in many applications.

Another solution is the providing of a mechanical scheme for the shifting of segments in one direction or the other when the brush arm is located at the boundary between a conductor and an insulating portion on the disc. This arrangement which requires a large number of moving parts, imposes speed limitations upon the encoder thereby severely limiting its widespread application.

Another method of avoiding ambiguities at sector boundaries which is widely in use is the double brush method. In this method, two sets of brushes are required when the method is used with commutative segments in the normal fashion. The least significant digit of the total binary representation has but one sensing brush while every other track has two sensing brushes. One sensing brush in each two brush track is positioned ahead of the position being encoded while the remaining brushes in each two brush track is positioned behind each position being encoded. The separation between the two brushes of each track is equal to the width (or angle in the case of the disc encoder) of the conductive segment on the track representing the least significant binary digit. The double brush method is set forth in greater detail in the text by R. K. Richards entitled "Digital Computer Components and Circuits," copyright 1957 by Van Nostrand, on pages 471–477. Basically, the double brush method consists of an examination of the preceding brush position to ascertain the reading of the preceding sensing brush. Once the reading of the preceding brush (that is the brush which senses the next least significant binary bit of the binary representation) is ascertained, its binary value determines which one of the two brushes reading the next binary bit is to be chosen for this particular reading. This "decision" is performed by logical switching circuits. This method of encoding in order to avoid the ambiguity therefore requires substantially twice the number of sensing brushes in its construction and also requires logical switching circuitry between each binary position thus greatly increasing the complexity of the shaft encoder.

The V-scan method of avoiding ambiguities which is also set forth in the text by R. K. Richards set forth above on pages 473–477 is quite similar to the double brush method but one major distinction lies in the fact that a logical decision of the nature of that made in the double method is required to be made after the sensing of each binary digit, whereas in the double brush method the decision is made only once upon the sensing of the least significant binary digit. The V-brush method therefore requires a larger number of decision making circuits thereby increasing the number of components and the complexity of the encoder.

The device of our invention overcomes the ambiguities of the types discussed above while at the same time avoiding the need for any logical decision making circuits associated with the encoder or the transmitting means thereof.

Our invention consists of a code stack which is comprised of a plurality of conductive discs which are alternately disposed between insulating discs. The insulating discs are arranged to form channels between adjacent insulating discs the walls of which guide the sensing brush and maintain it in proper alignment at all times. The stack of discs is positioned upon a rotable shaft which is inserted through the axis of the code stack and is fixedly secured thereto. One end of the rotatable shaft is operatively connected to a prime mover while the opposite end has a dial indicator fixedly secured thereto which cooperates with a dial to produce a visual reading of the angular position of the shaft.

The conductive discs have irregularly or cam-shaped perimeters which are formed in accordance with the unique code of our invention. The cut away or notched portions of the conductive discs cooperate with the raised portions of the adjacent insulating discs to form a continuous circular perimeter.

A sensing brush bears upon an associated conductive disc and acts to complete the electrical contact between the code stack and the input to the device utilizing the coded representations of the position of the rotatable shaft.

The unique code arrangement of the code stack contains a disc having binary "1" positions which indicate ambiguity zones. This conductive disc is so arranged that it emits a binary one for angular shaft positions which lie between shaft positions representing the intersections between adjacent decimal integers 0 through 9. Thus, instead of trying to avoid the possibility of an ambiguous reading, the code is arranged to recognize an ambiguous reading which reading can be recognized as a valid reading when accompanied with a binary "one" in the ambiguity bit position.

One practical application of our novel encoder lies in the utility meter area wherein meters such as water, gas or electric meters having a plurality of visually readable dials are designed to have their dial readings encoded for automatic reading thereof. An automatic meter reading system of this type is set forth in U.S. application Serial Number 71,093, now Patent No. 3,096,932, entitled "Automated Meter Reading System," by A. Brothman et al., filed February 23, 1961, and assigned to the assignee of the instant invention. Meters of the utility type are usually arranged with a set of dials in which the rotatable shafts for each dial are appropriately geared down by an intricate gearing system. During rotation of the gearing system engaging gears experience both radial and tangential forces originating from the gears with which they are meshed. In gas and water meters, the power available to drive the indicating register is sufficiently large so that a small amount of added tangential drag will not effect the accuracy of the device a noticable amount. However, watt-hour meters are driven by an eddy current motor whose power output is relatively small and, in addition, there are no formal bearings in the meter register. For these reasons, the permissible drag torque applied to the shaft of a watthour meter by the sensing brushes of an encoder, must be kept to a minimum. Since it is impossible to mechanically sense the surface of an encoder without applying some force, we used the novel idea of making the applied force directly oppose the normal separating forces of the gear train. In any set of spur gears, the force applied by the driving tooth to the driven tooth is a force composed of a tangential or driving component, and a radial component commonly called the separating force. Thus, our encoder in fact acts as an additional bearing means and, therefore, applies no measurable amount of drag to this sensitive instrument.

The coding of the code stack is arranged so that the binary representation for each decimal number is unique from the binary representation for any other decimal number. In addition, ambiguity readings are easily discernible from non-ambiguity readings due to the presence of a binary "one" in the ambiguity binary bit position. Each ambiguity reading is likewise easily discernible from another ambiguity reading thus preventing the possibility of any false identification of any given reading. The binary code selected is of the self-checking type with sufficient redundancy information to drastically reduce the probability of injecting errored information into the communication link. Furthermore, any alteration of the coded information due to the properties of the link itself can be detected at the receiving end. Thus a high degree of accuracy is attainable without the need for error checking circuits at the transmission end of the system.

The individual components of the code stack assembly may be produced by regular stamping means. The components are assembled simply by placing each disc of the assemblage upon a shaft and fastening both ends of the stack. The code stack assemblage affords greater accuracy than prior art devices without the introduction of additional complexity, expense and fabrication time.

Another preferred embodiment of the invention employs a coding arrangement which represents each clear, unambiguous decimal digit in a first binary code and which represents the region immediately surrounding the intersection between two decimal digits (i.e., the transition from one decimal digit to the next highest decimal digit) in a second binary code, and further which represents the approach of the second code by a third or anticipatory code.

The first code is an arbitrary or "gray" code whose digit positions have no binary weight. The binary representation for each decimal digit differs from all other binary coded decimal representations. Each representation has a fixed number of binary "ones" which provides an inherent self-checking feature.

The second code differs from the first code in that it has a fixed number of binary "ones" in each decimal representation which are greater in number than the number of binary "ones" in the decimal representation of the first code.

The code stack assembly is so arranged as to intersperse the first and second codes so that they alternate in appearance as the decimal digits advance from "0" through "9".

In order for the output utilization means, which may be a remote receiver-computer combination, to distinguish betwen the presence of either the first, second or third code, an ambiguity bit is provided wherein the presence of the ambiguity bit (i.e., a binary "one") denotes the presence of either the second code or the third code and the absence of the ambiguity bit (binary "zero") denotes the presence of the first code.

The arrangement of the binary ones in the first code is such that the binary "one" positions in the binary representations for each decimal digit differs from the binary representations on either side by the shift in position of one binary "one". Likewise the binary representations of the second code differ from the representations on either side by the shift in position one by one binary "one". In addition to this, each binary representation of the second code contains a binary "one" in each of the same digit positions in which the first code binary representations on opposite sides of the second code representation contains a binary "one". Thus, in making the transition from a binary representation of the first code to a binary representation of the second code and then to the binary representation of the next succeeding first code, the second code representation adds a binary "one" to the preceding first code representation and then loses a binary "one" to form the following first code representation.

This arrangement insures the fact that only one binary bit position makes a transition from one binary state to the opposite binary state in moving from one code representation to the other throughout the rotation of the code stack. This design eliminates the occurrence of an erroneous reading at a transition position due to a misalignment of the code stack sensing brushes since the possibility of obtaining an erroneous indication of a remote sector of the code stack has been eliminated.

The encoding segments of the code stack are further arranged to permit a large tolerance of sensing brush misalignment by staggering the segments which undergo a transition of binary states thus eliminating the possibility of deriving an erroneous reading.

In many installations the number of shafts whose angular positions are to be encoded are greater than one. For example, in gas and electric meters four shafts are employed to control the indicator hands of the four dials which are employed to represent any decimal number from 0000 to 9999.

Since each rotatable shaft of the utility meter requires a code stack, the number of leads required between the outputs of the code stacks and the input of the utilization device which receives the encoded data is four times the number of output leads of any one code stack. The requirement of a large number of leads makes such an encoding installation costly due to the excess number of wires needed and the complexity of wiring the appropriate connections.

To overcome this problem, we have provided a logical "OR" circuit arrangement which requires a total number of leads which is substantially less than the number of leads used in prior art encoding devices. The output leads of the same binary bit position are connected to a common point through equal resistances. The common leads which supply the input voltage level for the decimal character being encoded are each brought out separately so that they may be selectively energized to provide a positive voltage level for the code stack of the character being encoded while all other common leads are maintained near ground potential.

Since only one decimal character is encoded at a time, only one set of output leads is required. The resistors provide a voltage divider network which assures the fact that:

$$\frac{1}{N}(B+) \leq V_{\text{bin "one"}} \leq B+$$

and $$0 \leq V_{\text{bin "zero"}} \gg \frac{1}{n}B+$$

where $n$ = number of encoder output leads connected in parallel
$B+$ = the positive voltage supplied to the encoder common lead
$V_{\text{bin "one"}}$ = the output voltage level representing a binary "one"
$V_{\text{bin "zero"}}$ = the output voltage level representing a binary "zero."

Thus the binary representations are easily distinguishable from one another even in the worst possible case where all encoders are in the binary "1" position ON any particular bit. Binary "0" must always be smaller than $$\frac{1}{N}B+$$

whereas binary "1" must always be equal to or greater than $$\frac{1}{N}B+$$

It is, therefore, one object of our invention to provide a shaft angle encoder having a novel arrangement for recognizing ambiguity readings.

Another object of our invention is to provide a novel shaft angle encoder which is so arranged as to produce a self-checking feature.

Still another of our invention is to provide a shaft angle encoder having a first code read out for a non-ambiguous reading and a second code readout for ambiguous readings.

Still another object of our invention is to provide a novel shaft angle encoder for any analog type rotatable shaft meter having at least one dial indicator wherein the code stack arrangements do not measurably increase the drag ratio in meters, so as not to decrease the accuracy of the meter.

Another object of our invention is to provide a novel meter comprising means for encoding the meter decimal digit reading wherein the encoding arrangement generates a unique code having a plurality of checking features.

Still another object of our invention is to provide an encoder for generating a novel code wherein the periphery of each code disc is congruent to the periphery of every other code disc of the encoder.

Another object of our invention is to provide a shaft encoder having a plurality of conductive and insulating discs which are alternately arranged so as to provide electrical insulation, proper alignment and continuous guidance for the code stack sensing brushes.

Another object of our invention is to provide a shaft angle encoder having first and second alternately dispersed codes wherein the representations of each first code differ from the representations of adjacent first code representations by only one digit position.

Another object of our invention is to provide a shaft angle encoder having first and second alternately dispersed codes wherein the representations of each second code differ from the representations of adjacent second code representations by only one digit position.

Another object of our invention is to provide a shaft angle encoder having first and second alternately dispersed codes wherein the representations of each second code contains a binary "one" in every digit position which the neighboring first code representations contain a binary "one."

Another object of our invention is to provide a shaft angle encoder having first and second alternately dispersed codes wherein the representations of each second code contains a binary "one" in every digit position which the neighboring first code representations contain a binary "one" and where said first and second codes are further distinguished by the selective presence and absence respectively of an ambiguity bit.

These and other objects of the invention will become apparent when reading the following description in connection with the drawings, in which:

FIGURE 1 is a top view of the code stack assembly.

FIGURE 2 is a perspective view of one conductive disc employed in the code stack assembly of FIGURE 1.

FIGURE 3 is a perspective view of the insulating disc associated with the conductor disc shown in FIGURE 2.

FIGURES 4 through 10 are top plan views of the metallic or conductive discs together with their associated insulating discs, which are employed in the code stack assemblage of FIGURE 1.

FIGURE 11 is a top plan view and force diagram of a pair of meshed gears set forth for the purpose of showing the forces acting on the gears.

FIGURE 12 is a front view of the code stack assemblage of FIGURE 1.

FIGURE 13 is a schematic view showing the electrical connections between the input and output of the code stack assembly.

FIGURE 14 is a schematic view of a portion of the circuit of FIGURE 13 set forth for the purpose of explaining a particular condition which the code assembly assumes during its operation.

FIGURE 15 is a schematic diagram of the binary code employed in the shaft angle encoder of FIGURE 1 showing all of the conductive segments in relation to one another.

FIGURE 16 is a schematic diagram of another embodiment of the code stack arrangement for the encoder shown in FIGURE 1.

FIGURE 23 is a front view of a meter which may be combined with our novel code stack and which also serves to illustrate the novelty of our invention.

FIGURE 24 is a modified coding arrangement of the code shown in FIGURE 16.

Figure 17:
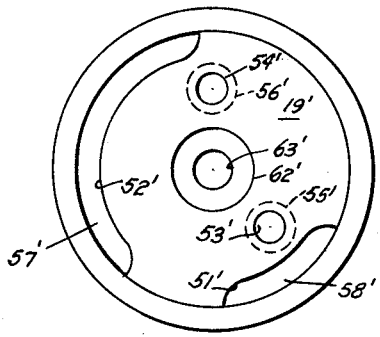
FIGURES 17 through 22 are top plan views of the conductive discs together with their associated insulating discs, which are employed in the encoder of FIGURE 1 and which are encoded in the arrangement shown in FIGURE 16.

Referring now to the drawings, FIGURE 1 shows a code stack assemblage 25 which is comprised of a plurality of insulating discs 11 through 17 and conductive discs 18 through 24 wherein each conductive disc 18 through 24 is separated from the neighboring conductive discs by insulating discs 11 through 17. The code stack 25 which is comprised of discs 11 through 24 is mounted for rotation upon rotatable shaft 26 which shaft is rotated by gear 27 which is fixedly secured to the shaft 26. Gear 27 may, for example, be the output gear of an electric watt-hour meter which drives shaft 26 so as to produce a visual reading of the units digit in kilowatt hours. The opposite end 26b of shaft 26 has a dial pointer 27a fixedly secured to the shaft. Pointer 27a cooperates with a dial face (not shown) located on face plate 28. The dial face is arranged in the usual way wherein the angular position of shaft 26 is determined by the position of pointer 27a with regard to the associated dial face on face plate 28. The dial face normally has the decimal numbers 0 through 9 equally spaced around the dial face. Although only one encoder is described, it should be understood that a greater number of encoders may be employed, each one being associated with a different dial face. It should further be noted that the manner in which the code stack assembly 25 is mounted, the dial face is completely accessible for visual reading since the code stack in no way interferes with the dial face. The check readings for determining reliability of the encoder and reading may also be made even though the meter reading equipment is in a de-energized state.

Read out from code stack 25 is performed by sensing brushes or members 31 through 37 which cooperate with conductive discs 18 through 24 respectively. The read out from sensing brushes 31 through 37 is a parallel read out which serves as an input to a utilization device. One such device which may utilize the read out from sensing brushes 31 through 37 is set forth in copending U.S. application Serial Number 126,278, filed July 24, 1961, entitled "Data Transmitter," By A. Brothman, and assigned to the assignee of the instant invention. The data transmitter set forth in the aforementioned application accepts the parralled read out from code stack 25; converts the read out to a serial read out; and transmits the read out in serial fashion to a centrally located data gathering point. The aforementioned data transmitter is set forth only as one possible utilization device for the instant invention and therefore plays no part in the novelty of my code stack but is set forth as being merely exemplary.

Sensing brushes 31 through 37 are inserted through holes (not shown) in post 38 and are secured in any suitable manner to the post which is in turn fastened to dial face plate 28 by fastening means consisting of a screw 41, lock washer 40 and resilient washer 39. Post 38 is formed of an insulating material in order to prevent any short-circuiting among the sensing brushes 31 through 37 fastened thereto.

The code employed in code stack 25 is a six bit binary code wherein reading from the least to the most significant bit the tracks represent 0, 1, 2, 3, 6 and Amb (which represents ambiguities as will be more fully described). The conductive discs representing each of these positions are 19, 20, 21, 22, 23 and 24 respectively. Conductive disc 18 carries the designation of the "Common" wherein the sensing brush 31 associated with the common disc 18 serves to establish electrical continuity with other conducting discs 19 through 24 by means of fastening bolt 29 which makes electrical contact at all times with each and every conductive disc 19 through 24.

In order to represent in binary code the decimal digits 0 through 9, the conductive discs 19 through 24 are arranged so that not all discs 19 through 24 are in electrical contact with their associated sensing brushes 32 through 37 during the entire cycle of rotation of rotatable shaft 26. Thus it can be seen that discs 19 through 24 are coded in such a fashion as to make electrical contact with their associated sensing brushes 32 through 37 at certain specified periods throughout their cycle of rotation and to be insulated during the remaining periods. The binary coding set forth above is normally known as the "2 out of 5" code. For example, to represent the decimal number 4, sensing brushes 33 and 35 must make electrical contact with their associated brushes whereas sensing brushes 32, 34, 36 and 37 must be electrically insulated from their respective discs thus resulting in binary code 010100 (where "0" represents no electrical connection and where "1" represents electrical connection). As another example, the decimal number 7 requires sensing brushes 33 and 36 to make electrical contact with their associated discs 20 and 23 while sensing brushes 32, 34, 35 and 37 must be electrically insulated from their associated discs, thus producing the output 010010. The preceding examples hold true when pointer 27a is either exactly half-way between the dial face positions of two adjacent decimal digits or is relatively close thereto. However, when pointer 27a stands either exactly over a decimal digit position or in the regions immediately before and after the decimal digit position on the dial face such as decimal digit 2 for example, the code stack 25 must provide accurate recognition of this angular position so as to avoid the possibilty of an erroneous reading which may occur as set forth in the introductory remarks above. The conductive disc 24 which provides the "Ambiguity" read out position indicates such an intersection or "transition" position in a manner to be more fully described.

The discs 11 through 24 have configurations which are clearly set forth in FIGURES 4 through 10. In conformity with the "2 out of 5" code, FIGURES 2 and 3 show clearly the manner in which the sensing brushes 32 through 37 are selectively connected and disconnected from their associated conductive discs 19 through 24 respectively. The disc 19 of FIGURE 2 is formed of a conductive material such as, for example, brass. Disc 19 is generally circular in shape but has a pair of elongated slots 51 and 52 notched along the perimeter of the disc.

FIGURE 3 is a perspective view of the insulating disc 11 shown in FIGURE 1 which cooperates with conductive disc 19 as will be more fully described. The outer diameter 61 of insulating disc 11 is greater than the outer diameter of the conductive disc 19. This relationship holds true with respect to each insulating disc and its associated conductive disc which thereby serves to both restrict and guide the sensing brushes 31 through 37 through the groove formed between adjacent insulating discs such as, for example, the groove 70 formed between insulating discs 16 and 17 as can best be seen in FIGURE 1.

Two raised projections 57 and 58 which are integrally molded with insulating disc 11 are strategically positioned upon the surface of disc 11 to cooperate with slots 51 and 52 cut in conductive disc 19. The raised projections 57 and 58 not only serve to insulate conductive disc 19 from its associated sensing brush 32 during certain portions of the rotation of disc 19, but also serve to rigidly position and secure disc 19 to insulating disc 11 to avoid any relatively angular movement to take place between discs 11 and 19. This is also true of all other conductive disc-insulating disc combinations.

Disc 19 is provided with an aperture 62 through which rotatable shaft 26 is inserted. Aperture 63 in insulated disc 11 also serves to permit insertion of rotatable shaft 26 but it should be noted that aperture 63 is substantially smaller than aperture 62. The reason for this is that rotatable shaft 26 being formed of a conductive material would electrically connect all of the conductive shafts to the dial face plate 28. Since aperture 62 is substantially greater than the outer dimension of rotatable shaft 26 the conductive disc 19 (as the central apertures of all other conductve discs are) is electrically insulated from the metallic shaft 26. The dimensions of aperture 63 in disc 11 are such as to form a pressure fit between aperture 63 and rotatable shaft 26 to guarantee rotation of disc 11 concurrently with rotation of shaft 26. The rotation of disc 11 is imparted to disc 19 due to the locking feature provided by slots 52 and 51 of disc 19 and cooperating projections 58 and 57 of insulating disc 11.

Aperture 53 in disc 19 is provided for the insertion of fastening means 29, the diameter of aperture 53 being substantially equal to the diameter of fastening means 29 so as to establish good electrical contact therebetween. Aperture 55 provided in insulating disc 11 provides for the insertion therethrough of fastening means 29.

Discs 12 through 16 and their associated conductive discs 20 through 24 are shown in their assembled positions in FIGURES 6 through 10 respectively. For example, FIGURE 7 sets forth the insulating disc 13 which has a plurality of raised portions 86, 87, 88, 89 which cooperate with slots 82, 83, 84 and 85 respectively to form the code disc for the "2" bit position of the binary code set forth above. It can be clearly seen that the length and occurrence of the conductive portions of the discs 11 through 16 forms a coding pattern, this pattern being the "2 out of 5" binary code. FIGURE 15 is a planar development of the coded circular discs 19 through 24 wherein the dark segments represent the conductive portions of the discs 19 through 24 which make contact with the associated sensing brush while the spaces between conductive segments are shown by the blank areas in FIGURE 15. In this diagrammatic representation, in order to better visualize the operation, sensing brushes 31 through 37 should be considered as remaining stationary while the planar development of the conductive segment moves in the direction shown by arrow 130. Another way of considering FIGURE 16 as a dynamic picture of the code stack is by positioning a sheet of paper having a narrow slit which is perpendicular to arrow 130 and moving the paper in a direction opposite to that of arrow 130. When the planar development moves beneath sensing brushes 31 through 37 to a point beyond the right-hand most portion of FIGURE 15, it should be understood that the segments repeat themselves; that is, that the left-hand most portion of FIGURE 15 is connected with the right-hand most portion of the figure to form an endless belt having predetermined conductive and nonconductive areas.

When the development of FIGURE 15 moves in the direction shown by arrow 130 so that the brushes 31 through 37 are in direct alignment with the decimal numbers 1 through 0 shown at the top of FIGURE 15, the binary representation of each decimal number 1 through 0 that will appear at the output of the sensing brushes 31 through 37 is set forth in the table 135. It should be understood that the elongated solid segment 18, which represents the "common" disc of the code stack 25 of FIGURE 1, supplies the voltage level which selectively appears at the sensing brushes 32 through 37 depending naturally upon the angular position of rotatable shaft 26.

It can be seen from table 135 that the coding for each decimal number 0 through 9 has an even number of binary ones thus producing an inherent self-checking feature. That is, upon the occurrence of an odd number of binary ones, in any binary representation, it becomes immediately obvious that a mistake has occurred in the transmission of the data. Since the probability of the occurrence of a compensating error is very small, the "2 out of 5" code is a very desirable coding arrangement. It should be understood, however, that other and different coding arrangements may be used.

Since the rotatable shaft 26 is capable of assuming an infinite number of angular positions throughout its rotation, shaft 26 is not limited to assuming positions in the region between the decimal digit positions of the decimal numbers 1 through 0 (on the dial face) as shown at the top of FIGURE 16 but shaft 26 may occupy positions during its rotataion such that upon a read out request, sensing brushes 32 through 37 occupy a position either exactly over or immediately near a decimal number such as the position shown by arrow 131 which is almost exactly over the decimal number 2. In this position it can be seen that the sensing brush 37 makes electrical contact with conductive segment 132 of the ambiguity disc 24. In this position the sensing brushes 35 and 34 may be misaligned so that they make electrical contact with segments 133 and 134 respectively, thereby producing a binary representation which set forth in table 140 of FIGURE 15 on the line identified by arrow 136. Thus it can be seen that due to a possible misalignment of sensing brushes 34 and 35 with respect to the code stack 25 of FIGURE 1, a greater number of binary "ones" that appears in the binary representations shown in table 135 may therefore appear at the outputs of sensing brushes 32 through 37. The possible combinations that may occur under these circumstances are set forth in table 140 of FIGURE 15 wherein the binary representations have been written on lines which occupy positions midway between the vertical decimal numbers column of table 140. Thus it can be seen that the possibility of a misalignment between the code stack and the associated sensing brushes is reconized rather than avoided, as was attempted in the prior art. Thus it can be seen upon considering table 140 that the binary "one" in the ambiguity position is present in every binary representation whenever the sensing brushes occupy a position which is in the region of the transition between two decimal numbers of the dial face. Thus, since it is a practical impossibility to completely avoid erroneous readings, the ambiguity disc 24 recognizes the occurrence of this angular shaft position and transmits this reading accordingly. It can further be seen from the binary code set forth in table 140 that the binary representation for each position between two decimal numbers is unique and differs from the prior representation of any other such position.

Figure 18:
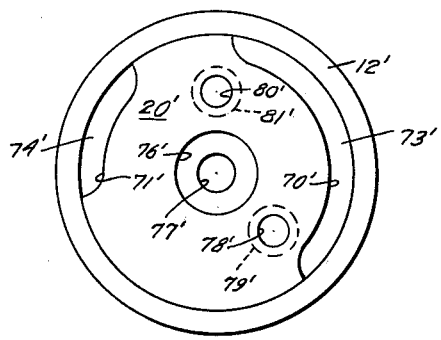
Figure 19:
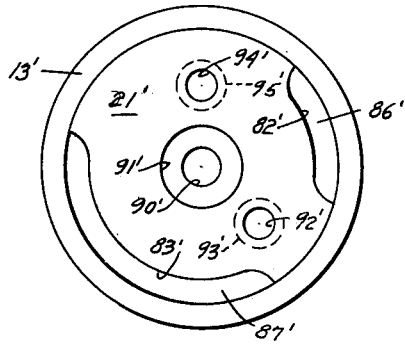
Figure 20:
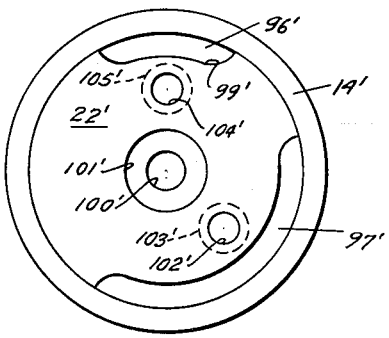
Figure 21:
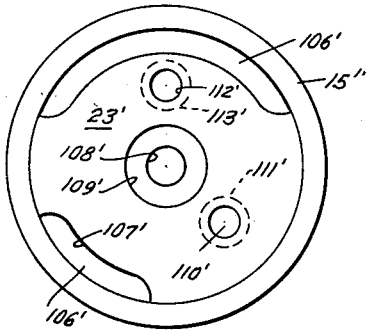
Figure 22:
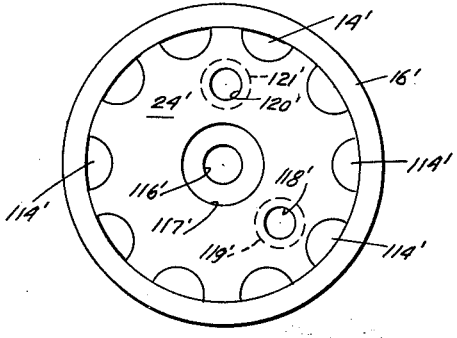

Another coding arrangement which is set forth in FIGURE 16 and which may be employed in encoder 25 shown in FIGURE 1 by substituting the disc arrangements of FIGURES 17 through 22 for the disc arrangements shown in FIGURES 5 through 10, respectively, has a number of unique features which are not found in any other coding arrangement.

For purposes of illustrating the novelty of our code stack arrangement, consider the meter dials 300 through 303 shown in FIGURE 23 wherein the dial 300 represents the least significant decimal digit and dial 303 represents the most significant decimal digit. Each dial has associated with it an indicating arm 300a through 303a, respectively, each arm being rotated by an associated shaft 300b through 303b, respectively, to which shaft the pointers 300a through 303a are fixedly secured. Although meters of this general type may be arranged in any fashion, it will be assumed here that all indicating arms 300a through 303a rotate in the clockwise direction. It should further be understood that the meter dials are connected to one another by gear trains which have a 1 to 10 ratio between adjacent dials when considering the ratios in the direction from the least significant digit dial 300 to the most significant digit dial 303. The gear connections are represented schematically in FIGURE 23 by the dash lines 304, 305 and 306. Each shaft 300b through 303b has an encoder 300c through 303c, respectively, cooperatively connected thereto which connections are schematically represented by the dashed lines 300d through 303d respectively. The encoders are of the same type as shown in FIGURE 2.

The indicating arms 300a through 303a are positioned in FIGURE 23 to represent the decimal number 3790. It can be seen that since there are 10 equal divisions around each dial face, that each decimal number occupies an angular sweep around the dial face of exactly 36°. Thus, although it can be seen that each scale marking has a decimal number associated with it, each decimal number actually occupies a 36° region between two such scale markers. For example, the decimal number 1 occupies the angular region between scale markers 307 and 308 and the decimal number 2 occupies the angular region between scale markers 308 and 309. The transition from the decimal number 1 to the decimal number 2 takes place at the instant that the indicating pointer arm 300a is in exact angular alignment with scale marker 308. Since it is extremely difficult to tell whether the indicating arm is pointing to the decimal region between scale markers 307 and 308 or the decimal 2 region between 308 and 309, the region which lies in close proximity to the scale markers, such as scale marker 308 for example, is known as an ambiguity or "smear" area.

The ambiguity area is identified by the conductive portions of the ambiguity bit position conductive disc 24' (see FIG. 16). It can be seen from this figure that the leading edge, such as for example, the leading edge 310 of one conductive portion 315 lies 13.5° before the line 311 which represents the transition from the decimal 2 to the decimal 3, while the trailing edge of conductive portion 315 of the disc 24' follows the line 311 by an angle of 4.5°.

Thus it can be seen that each conductive portion identifies the ambiguity region which has been chosen as being 13.5° to the left of each line marking the transition between two decimal numbers and 4.5° to the right of each transition line. The ambiguity region is further identified as a "smear" between two decimal numbers as indicated by the presence of three binary "ones" out of the five binary bit positions which binary "ones" occur in the region from 9° to the left of a transition line, such as transition line 311, up to the transition line, which three out of five code constitutes the logical sum of the binary "one" bits which are present in the two out of five codes which represent the neighboring decimal numbers lying adjacent the transition line, as will be more fully described.

As can be seen, the indicator arm 300a through 303a represent the decimal number 3790. Indicator arm 301a apparently lies in the exact vertical angular alignment with angular scale marker 320. The code formed by the encoder for decimal 9 as can be seen in FIG. 16, lies at the transition line 320 and is a three out of five binary code which also has a binary "one" in the ambiguity bit position. The presence of the binary "one" in the ambiguity bit position identifies the fact that a choice must be made as to whether the code generated by the encoder 301c which is associated with the dial face 301 should represent decimal 8 or should represent decimal 9. The final determination is made however, by the condition of the code for least significant decimal bit which is identified by dial 300, which reads decimal 0. If, however, the least significant decimal bit was a 9, then it can clearly be seen that the choice to be made regarding the "smear" between decimal 8 and decimal 9 at dial 301 should be that of the code representing the decimal 8.

As can clearly be seen, each 36° sweep of any one of the dials shown in FIGURE 23 is equivalent to a 360° sweep on the dial immediately to its right, or, in other words, the dial of the next least significant decimal digit. The novel data encoders, that is, the code stacks of our invention, when used in meters having dials of the nature of those shown in FIGURE 23, are extremely advantageous in that they serve to accurately identify which decimal representation is to be chosen when a "smear" condition is present. For example, in considering the dials 303 and 302, it can be seen since the next least significant bit to 3 is the decimal number 7, that the indicator arm 303a should lie 25.2° below the scale marker 325 at the point which is 25.2° beyond scale marker 325 which is represented in FIGURE 16 by transition line 325a. It can be seen that the leading edge 327 of conductor portion 326 of the ambiguity bit disc 24' will make engagement with its associated sensing member (not shown) thus providing a two out of five code with a binary one in the ambiguity bit position. This code may then be compared with the code for the preceding decimal position which must represent a decimal 7 digit in order for the transmission to be correct. Although the circuitry for performing this comparison operation is not set forth in this application, such comparison circuitry may take many forms, one typical form being set forth fully in copending U.S. application Serial Number 241,917, entitled "Data Receiver," filed December 3, 1962, by A. Brothman et al., and assigned to the assignee of the instant invention.

Thus our novel encoder provides a coding arrangement which sets forth the following requirements when transmitting encoded data from a meter having at least two decimal digit position encoders:

(a) The presence of the code for a decimal 7, 8, 9 or 0 in a significant digit imposes the requirement that the code for the next most significant digit have a binary "one" state ambiguity bit.

(b) The presence of the code for a decimal 8 or 9 in a less significant digit imposes the requirement that the code for next most significant digit be in its 3-out-5 mode.

(c) The presence of the code for a 9 (clear or ambiguous) demands that the lesser of the two decimal numbers of the next most significant decimal digit "smear" be accepted.

(d) The presence of the code for a decimal 0 (clear or ambiguous) demands that the greater of the two decimal numbers of the next most significant digit "smear" be accepted.

This arrangement provides the highest degree of transmission reliability without resort to the technique of double transmission which technique is too time consuming to be practicable.

Referring specifically to FIGURE 16 table 180 sets forth the binary code arrangements for a first or "non-ambiguous" code. The name "non-ambiguous" is employed since it refers to a code which represents a decimal digit which is in a position when being read that can clearly not be confused with any other decimal digit position. Such a position would be, for example, that shown by arrow 191 which lies clearly in the zone designated decimal 5.

Each decimal digit from 0 through 9 is represented in a "Gray" code which name is well known in the art as a name employed to distinguish the code from one in which each binary bit position has a weighted significance such as, for example, a binary coded decimal representation. It should be noted that each binary representation differs from its neighboring binary representations by a shift of only one binary "one." For example the representation for decimal number 5 has binary "ones" in the second and fifth positions (i.e., columns 2 and 5) while the representations for decimal numbers 4 and 6 have binary "ones" in columns 3 and 5 and 1 and 2, respectively. Thus, only one binary "one" position differs in adjacent representations which acts to minimize erroneous readings as will be more fully described.

The second or "ambiguous" code shown in table 181 is a "three out of five" code in that each binary representation contains a binary "ones" in three out of the five columns 1 through 5. It should be noted that each binary representation differs from every other binary representation. In addition, it should be noted that ambiguity code contains a binary "one" in each column that the neighboring binary representations of the first code of table 180 contain binary "one." For example, the binary representation in the first code is 00101 for decimal "4" and 01001 for decimal "5" (see numerals 190 and 191). The binary representation in the second code for the transition from decimal "4" to decimal "5" is 01101 (see numeral 192). Thus, in moving from an unambiguous decimal "4" reading to the crossover or transition region between "4" and "5" an ambiguity region produces the code 01101 which differs from decimal 4 by the presence of a binary "one" in the second position 193 from the left (i.e. column 2 as shown in table 180).

In moving from the ambiguous reading 01101 to the decimal 5 representation, 01001 the decimal 5 representation differs from the ambiguous reading by the absence of a binary "one" in the third position from the left (i.e. column 2 as shown in table 180 and the row designated by numeral 194).

Thus it should be noted that in moving from first code representations to second representations and then back to first code representations, the electrical connection for only one sensing brush is either completed or severed at one time. Therefore, although there may be some uncertainty in the digit representation with regard to which of the two adjacent sections is being sensed, the possibility of obtaining an erroneous indication of some remote section is avoided. However, this uncertainty can easily be resolved and the decision as to which decimal is correct can be made with a high degree of accuracy at the receiving end by logical decision making circuitry similar to that disclosed in aforementioned U.S. patent application No. 241,917, entitled "Data Receiver."

The binary representations in columns 6 of tables 180 and 181 serve to identify the code being sensed at the instant position readout is given. Column 6 of table 180 contains a binary "zero" for each and every decimal representation in the first code thereby identifying the presence of the first code whereas column 6 of table 181 contains a binary "one" in column 6 for every binary representation serving to identify the presence of the second or "ambiguous" code of table 181.

To further clarify the function of the ambuity bit in column 6 tables 180 and 181 assume the presence of binary "ones" in three of the columns 1 through 5 and a binary "zero" in column six, such as 101010. This is an erroneous reading since a binary "one" should be present in the right-hand most position to identify the presence of the 3 out of 5 (ambiguous) code. If the readout is 010101 this denotes either the decimal 7 or an erroneous reading and the decision as to which is true must be made at the receiving end based upon the state of the next least significant digit as explained in patent application "Data Receiver," U.S. application No. 241,917, mentioned previously. If the readout is 010111 a decision must be made as to whether it is a 7 or 8 at the receiving end logic since a binary "one" in the right-hand most position should be accompanied with binary "ones" in three of the five left-hand most digit positions (i.e. columns 1–5 of tables 180 and 185).

It can be seen in FIGURE 16 that the ambiguity disc 24' is conductive (i.e., makes contact with its associated sensing brush) 13½° to the left and 4½° to the right of the transition hairline between adjacent digits. This enables the misalignment of sensing brushes to be as great as that shown by centerlines 195 and 196.

The conducting and insulating discs employed in the modified code arrangement of FIGURE 16 are shown in FIGURES 17 through 22 wherein A the only distinction between these members 18' through 24' and the members 18 through 24 respectively is in the length of the arcuate segments which are disposed between the notched portions such as the notched portions 70–72 of FIGURE 6, since the arcuate lengths of these segments and their angular disposition around the disc determine the coding arrangement.

A binary "one" in column six of table 180a serves as the means for identifying the approach of an ambiguous 3 out of 5 code, i.e., the transition between the unambiguous 2 out of 5 code and the ambiguous 3 out of 5 code. This unique arrangement of the conductive segments insures a make contact before break contact action of the brushes.

It should be noted that each disc 19' through 23' (see FIGURES 17–21) contains two notches and that the notches are identical in arcuate length. The only distinction between the discs of FIGURES 17 through 21 is that they are angularly displaced with respect to one another (as shown in FIGURE 16) so that angular relations between the notches and the apertures such as apertures 53'–80' and the notches 51'–52' is different in each disc 19' through 24' so that all insulating and conducting discs may be made from one die while the apertures may be made after each disc is formed.

It should be further noted that the unique code arrangement of FIGURE 16 may be utilized so that the regions of each disc of the code stack which are identified by binary "0" ambiguity bit position may be changed to the binary condition while the regions identified by binary "one" in the ambiguity bit position may be changed to the binary "0" condition. Thus the 3 out of 5 arrangement may be employed to represent the non-ambiguous areas while the 2 out of 5 code may be employed to represent the ambiguous areas of the decimal numbers on the dial faces 300–303 shown in FIGURE 23. The only change which need be made is that of retaining the ambiguity disc conductive portions in their original positions. Thus it is possible to form a break before make code arrangement as an alternative to the make before break code arrangement of FIGURE 16. The break before make code arrangement is set forth in FIGURE 24 while the tables 400 and 401 show the 3 out of 5 and 2 out of 5 code arrangements respectively, wherein it should be noted that the code arrangements of Figure 24 is the inverse of the code arrangements of FIGURE 16.

FIGURE 12 shows one sensing brush such as sensing brush 31 inserted through insulating post 38. The end 31a of sensing brush 31 bears upon the inner perimeter of disc 18 and is biased in such a manner as to impose a force upon disc 18, in the direction shown by arrow 147, that being radially inward with respect to rotatable shaft 26. It can be seen that since there are seven sensing brushes 31 through 37, the individual forces exerted yield a total force exerted upon rotatable shaft 26 is seven times as great as the force exerted upon rotatable shaft 26 by individual sensing brush 31. The brush is positioned in such a way as to oppose the separating force associated with spur gear set in order to diminish the drag effect that the encoder assembly will of necessity apply to the gear train. The purpose of this radial force is for the following reason:

FIGURE 11 shows a pair of cooperating gears 158 and 159 whereby gear 158 is driven into counter-clockwise rotation as shown by arrow 153 under the influence of gear 159. Gear 158 may, for example, be connected or mounted upon rotatable shaft 126. The force resulting upon gear 158 by 159 is shown by force vector 150. The reason that vector 150 assumes the direction it does is that in order to experience a rolling action (rather than a sliding action) with tooth 155 causes the force 150 to act at an angle θ to a line joining the centers of the two gears. This angle is usually either 75.5° of 70° depending upon whether high speed or low speed application, respectively, is desired. The force imparted by gear 159 acts normal to the edge of tooth 155 resulting in force vector 150. This vector resolves itself into radial (separation) and tangential (driving) component vectors 151 and 152, respectively. Tangential (driving) vector 152 acts to drive gear 158 into rotation in the direction shown by arrow 153 whereas radially directed vector 151 acts to urge gear 158 to separate from 159. Force 157' shows in FIGURE 11 which is the resultant force of the forces 147 of each sensing brush such as brush 31 is directed so that it is equal and opposite to force vector 151 thereby acting as an auxiliary bearing which acts in such a way as to add no drag to the meter due to the mounting of the code stack upon the meter movement.

Thus it can be seen that the addition of my novel code stack assemblies into a gearing arrangement of the nature found in standard watt-hour meters presently in use does not place any extra burden on the gearing arrangement but, on the contrary, acts to produce a reading which is as accurate as prior art meters of this general category without code stacks affixed thereto.

FIGURE 13 shows a schematic diagram for connecting a plurality of code stacks such as the code stack assembly 25 of FIGURE 1 to an output untilization device (not shown). The electrical connection between the conductive disc 19 and its associated sensing brush 32 which represents the "0" track is represented by the symbol 160 whereas no electrical connection is represented by the symbol 161 shown between conductive segment 20 and sensing brush 33 shown in FIGURE 13. The manner of operation is as follows:

Only one code stack assemblage, such as code stack assemblage 10a of the three code stack assemblages 10a through 10c, is read at a time. This serial selective readout is performed by impressing a positive D.C. voltage at points 167, 169 and 171 in serial fashion in any well known manner such as, for example, by stepping switch 250. At the instant that code stack assemblage 10a is being sensed, a positive voltage is impressed at common point 167 whereas no voltage is impressed at common points 169 and 171 by any well known means. At this instant, assuming contact is made between sensing brush 32 and conductive disc 19 as shown by symbol 160, the conductive path is as follows:

From a positive voltage, for example, 48 volts at point 167 through connection 160, resistor 172 to the first track wire 175. Also, from "zero" track wire 175, a conductive path exists through resistor 173, closed connection 162 and resistor 168 to ground potential 176 (no positive voltage is impressed at point 169). A path parallel to this path consists of resistor 174 connected to the first track line 175 through closed connection 164, resistor 170 to ground potential 176 (no positive voltage is impressed at point 171). This portion of the circuit is set forth in FIGURE 14.

It should be noted that normally a conductive path does not exist at points 162 and 164 but this example is offered here to set forth the worst possible condition in order to point out the effect upon the encoded readout of the arrangement of FIGURE 13. Resistors 172, 173 and 174 are each 20 kilohms, for example, while resistances 168 and 170 are one kilohm each. Thus it can be seen that in this condition, the voltage divider which consists of resistor 172, the parallel resistances 173–168 and 170–174, divide the 48 volt input impressed at common point 167 so the ⅓'s of the 48 volt input appears at the "zero" track conductor 175. This naturally assumes that all three contact sets of the first track are closed at the same instant. It can be seen that if only one of the two contact sets 162 and 164 are closed at the time that contact connection 160 is closed, then one-half of the 48 volt input will appear at the first track conductor 175, while if connections 162 and 164 are both open at the time connection 160 is closed and being read then the entire 48 volt input will appear at the first track conductor 175. Thus, upon the appearance of less than ⅓ of the input voltage at the first track conductor 175, this indicates a binary "zero" condition whereas any value equal to or greater than ⅓ of the input voltage (i.e., equal to or greater than 16 volts) appearing at the first track line conductor 175 indicates a binary "one" condition at the conductive disc 19 which represents the decimal "zero" bit position of the "2 out of 5" code. Every other track, such as the tracks 1, 2, 3, 6 and Ambiguity (Amb), is connected in the same exact manner as the first track conductor. This arrangement greatly reduces the number of leads needed between the sensing brushes over prior art arrangements. For example, without the arrangement shown in FIGURE 14, six leads are needed for the six binary positions and one lead is needed for the common lead. Thus 7 leads are needed for each code stack, and in the example of FIGURE 14 since there are three code stacks, a total of 21 wires must be positioned between the code stack assemblages 10a through 10c and the output utilization device (not shown). However, with the arrangement of FIGURE 14 only 6 wires for the binary representations, and three wires for the commons are needed, giving a total of 9 wires needed between the code stacks 10a through 10c and the output utilization device. This results in a saving over half the wires needed in the prior art arrangement. Although FIGURE 13 shows an arrangement wherein only three encoders 10a, 10b and 10c are wired to the logical "OR" readout arrangement, it should be understood that any number of encoders may be wired in this fashion wherein the worst condition for a binary "one" voltage is $$\frac{B+}{N} \leq V_{b \text{ in "one"}} \leq B+$$

and for a binary "zero" voltage is $$0 \leq V_{b \text{ in "zero"}} \ll \frac{1}{N} B+$$

as was previously described.

The insertion of the resistances 172, 173 and 174 may be performed as shown in FIGURE 12 wherein the sensing brush 31 may be one terminal of a resistor 31b which is inserted through an aperture 38a in insulating post 38 wherein the opposite terminal 31c of resistor 31b may be connected in any suitable manner to the input terminal of a utilization device. Thus a resistor 31b serves as both the needed resistance value as required in the schematic of FIGURE 14 and as the sensing brush 31 which cooperates with the conductive disc 18.

The resistance needed may also be added by forming the conductive discs 19 through 24 (or 19' through 24') of a material having resistivity of the order of the resistances employed in FIGURE 13 or by applying a resistive coating upon the conductive edges of the discs 19 through 24 which come into engagement with their associated sensing members 31 through 37 respectively (see FIGURE 1).

It can therefore be seen that we have provided a novel code stack which is designed so that it can be manufactured at low cost and which has a novel coding arrangement for the recognition of ambiguous readings. The code stack is mounted with respect to the normal utility meter gearing systems in such a manner as to introduce no appreciable drag and thereby does not change the sensitivity in such meters. Employment of a plurality of code stacks for meters having a plurality of dial faces such as water, gas and electric meters presently in use permits the connection between the plurality of code stacks and the utilization connected thereto to be performed in a relatively simple manner since less than half the number of conductors are required as opposed to the number needed in prior art devices.

In the foregoing, we have described our invention only in connection with preferred embodiments thereof. Many variations and modifications of the principles of our invention within the scope of the description herein are obvious. Accordingly, we prefer to be bound not by the specific disclosure herein but only by the appending claims.

We claim:

1. A shaft angle encoder comprising first rotatable means capable of assuming a plurality of discrete angular positions for generating a first plurality of binary coded signal groups, each of said signal groups representing one discrete angular portion of a complete circle of revolution, second means for recognizing shaft angle positions which lie in the immediate region surrounding the adjacent ends of neighboring angular portions, said second means including third means for generating a second binary coded signal groups which are adapted to be easily distinguishable from said first binary coded signal groups, said first rotatable means comprising a plurality of conductive discs, a plurality of insulating discs, said conductive and insulating discs being stacked in alternating fashion for insulating the faces of said conductive discs each from the other, said arrangement being adapted for mounting to a rotatable shaft, each of said insulating discs having at least one projection on a face thereof, the projections of each of said insulating discs having a first side concentric with the arcuate periphery of its associated conductive disc, the first arcuate sides of each of said projections on each insulating disc differing in length from the first arcuate sides of the remaining projections.

2. A shaft angle encoder comprising first rotatable means capable of assuming a plurality of discrete angular positions for generating a first plurality of binary coded signal groups, each of said signal groups representing one discrete angular portion of a complete circle of revolution, second means for recognizing shaft angle positions which lie in the immediate region surrounding the adjacent ends of neighboring angular portions, said second means including third means for generating a second binary coded signal groups which are adapted to be easily distinguishable from said first binary coded signal groups, said first rotatable means comprising a plurality of conductive discs, a plurality of insulating discs, said conductive and insulating discs being stacked in alternating fashion for insulating said conductive discs each from the other, said arrangement being adapted for mounting to a rotatable shaft, each of said insulating discs having at least one projection, the projections of each of said insulating discs having a first side concentric with the arcuate periphery of its associated conductive disc, the first arcuate sides of each of said projections differing in length from the first arcuate sides of the remaining projections, each of said conductive discs having at least one notch along its periphery, the notch of each conductive disc having a configuration which is adapted to receive the arcuate projection of its associated insulating disc.

3. A shaft angle encoder comprising first rotatable means adapted for mounting to a shaft capable of assuming a plurality of discrete angular positions for generating a first plurality of binary coded signal groups, each of said signal groups representing one discrete angular portion of a complete circle of revolution, second means for recognizing shaft angle positions which lie in the immediate region surrounding the adjacent ends of neighboring angular portions, said second means including third means for generating a second binary coded signal groups which are adapted to be easily distinguishable from said first binary coded signal groups, said first rotatable means comprising a plurality of conductive discs, a plurality of insulating discs, said conductive and insulating discs being stacked in alternating fashion for insulating said conductive discs each from the other, said arrangement being adapted for mounting to a rotatable shaft, each of said insulating discs having at least one projection, the projections of each of said insulating discs having a first side concentric with the arcuate periphery of its associated conductive disc, the first arcuate sides of each of said projections differing in length from the first arcuate sides of the remaining projections, said conductive and said insulating discs having first and second centrally located apertures respectively, said first apertures having a diameter greater than the diameter of said shaft to be electrically insulated therefrom, said second apertures having a diameter substantially equal to the diameter of said shaft to cause the rotation of said shaft to be imparted to said insulating discs, said projections and said slots cooperating to impart rotation of said insulating discs to said conductive discs.

4. A shaft angle encoder comprising first rotatable means capable of assuming a plurality of discrete angular positions for generating a first plurality of binary coded signal groups, each of said signal groups representing one discrete angular portion of a complete circle of revolution, second means for recognizing shaft angle positions which lie in the immediate region surrounding the adjacent ends of neighboring angular portions, said second means including third means for generating a second binary coded signal groups which are adapted to be easily distinguishable from said first binary coded signal groups, said first rotatable means comprising a plurality of conductive discs, a plurality of insulating discs, said conductive and insulating discs being stacked in alternating fashion for insulating said conductive discs each from the other, said arrangement being adapted for mounting to a rotatable shaft, each of said insulating discs having at least one projection, the projections of each of said insulating discs having a first side concentric with the arcuate periphery of its associated conductive disc, the first arcuate sides of each of said projections differing in length from the first arcuate sides of the remaining projections, said conductive and said insulating discs having first and second apertures positioned a predetermined distance away from the axes of said discs, a cylindrical conductive means inserted through said apertures for establishing a conductive path between each of said conductive discs, said cylindrical means including fastening means for securing said discs to form a unitary assembly.

5. A shaft angle encoder comprising first rotatable means capable of assuming a plurality of discrete angular positions for generating a first plurality of binary coded signal groups, each of said signal groups representing one discrete angular portion of a complete circle of revolution, second means for recognizing shaft angle positions which lie in the immediate region surrounding the adjacent ends of neighboring angular portions, said second means including third means for generating a second binary coded signal groups which are adapted to be easily distinguishable from said first binary coded signal groups, said first means including means for generating said first binary coded signal groups in a two-out-of-five binary code arrangement wherein all of said code groups differ from each other, said third means including means for generating said second binary coded signal groups in a three-out-of-five binary code arrangement wherein each of said code groups differ from each other.

6. A shaft angle encoder comprising first rotatable means capable of assuming a plurality of discrete angular positions for generating a first plurality of binary coded signal groups, each of said signal groups representing one discrete angular portion of a complete circle of revolution, second means for recognizing shaft angle positions which lie in the immediate region surrounding the adjacent ends of neighboring angular portions, said second means including third means for generating a second binary coded signal groups which are adapted to be easily distinguishable from said first binary coded signal groups, fourth means for sensing the binary coded signal groups, said fourth means being adapted to sense the binary coded signal group which correctly represents the angular position of said first and second means regardless of the position of said first and second means, said fourth means including means to generate a binary bit wherein one state of said bit identifies said first code group and the opposite state identifies said second code group.

7. A shaft angle encoder comprising first rotatable means capable of assuming a plurality of discrete angular positions for generating a first plurality of binary coded signal groups, each of said signal groups representing one discrete angular portion of a complete circle of revolution, second means for recognizing shaft angle positions which lie in the immediate region surrounding the adjacent ends of neighboring angular portions, said second means including third means for generating a second binary coded signal groups which are adapted to be easily distinguishable from said first binary coded signal groups, said first means including means for generating said first binary coded signal groups in a two-out-of-five binary code arrangement wherein all of said code groups differ from each other, said third means including means for generating said second binary coded signal groups in a three-out-of-five binary code arrangement wherein each of said code groups differ from each other, and wherein each of said second code groups differs from the adjacent second code groups in only one bit position.

8. A shaft angle encoder comprising first rotatable means capable of assuming a plurality of discrete angular positions for generating a first plurality of binary coded signal groups, each of said signal groups representing one discrete angular portion of a complete circle of revolution, second means for recognizing shaft angle positions in the immediate region surrounding the adjacent ends of neighboring angular positions, said second means including third means for generating a second binary coded signal groups which are adapted to be easily distinguishable from said first binary coded signal groups, said first means including means for generating said first binary coded signal groups in a two-out-of-five binary code arrangement wherein all of said code groups differ from each other, said third means including means for generating said second binary coded signal groups in a three-out-of-five binary code arrangement wherein each of said code groups differ from each other and wherein each of said second code groups differs from the adjacent second code groups in only one bit position, each of said second code groups being the composite of the adjacent first code groups.

9. A plurality of shaft angle encoders each comprising first rotatable means capable of assuming a plurality of discrete angular positions for generating a first plurality of binary coded signal groups, each of said signal groups representing one discrete angular portion of a complete circle of revolution, second means for recognizing shaft angle positions which lie in the immediate region surrounding the adjacent ends of neighboring angular portions, said second means including third means for generating a second binary coded signal groups which are adapted to be easily distinguishable from said first binary coded signal groups, said first rotatable means comprising a plurality of conductive discs, a plurality of insulating discs, said conductive and insulating discs being stacked in alternating fashion for insulating said conductive discs each from the other, said arrangement being adapted for mounting to a rotatable shaft, the outer diameter of said insulating discs being greater than the outer diameter of said conductive discs forming a plurality of substantially U-shaped grooves, a plurality of sensing members each being positioned to bear upon an associated conductive disc, said substantially U-shaped grooves being adapted to guide the associated sensing member in said groove, impedance means each having a first terminal connected to an associated sensing member, the opposite end of impedance means connected to like sensing members of each of said encoders being connected in common, means for selectively connecting a positive voltage to only one of said encoders at any given instant, the outputs of the said energized encoders appearing at said common points in parallel fashion.

10. A shaft angle encoder comprising first rotatable means capable of assuming a plurality of discrete angular positions for generating a first plurality of binary coded signal groups, each of said signal groups representing one discrete angular portion of a complete circle of revolution, second means for recognizing shaft angle positions which lie in the immediate region surrounding the adjacent ends of neighboring angular portions, said second means including third means for generating second binary coded signal groups which are adapted to be easily distinguishable from said first binary coded signal groups, fourth means for sensing the binary coded signal groups, said fourth means being adapted to sense the binary coded signal group which correctly represents the angular position of said first and second means regardless of the position of said first and second means, said fourth means including means to generate a binary bit wherein one state of said bit identifies said first code group and the opposite state identifies said second code group, the reading portion of the said one state of said bit being further adapted to identify the immediate approach of said second code group.

11. A meter for encoding a decimal reading of a quantity being measured wherein said decimal reading is at least two decimal digits in length; first and second means each mounted on rotatable shafts for digitizing the angular positions of the meter utilized to identify by a decimal number the quantity being measured; gear means for imparting rotation in a 1:10 ratio to one of said shafts in response to rotation of the other of said shafts; said first and second means each being comprised of a rotatable drum capable of assuming any angular position in a complete circle of rotation; said circle being divided into a plurality of discrete angular portions; first conductive means on the surface of said drum for generating a first plurality of binary coded signal groups wherein each one of said signal groups represents one of said discrete angular portions around said circle; second conductive means on said drum for identifying shaft angle positions which lie in the immediate region surrounding the adjacent ends of neighboring angular portions; said second conductive means cooperating with said first conductive means to generate a second plurality of binary coded signal groups to identify an angular shaft position in the immediate region of two adjacent angular portions; stationary sensing means making wiping contact with the surface of said drum for reading out said binary coded signal groups; said second code group being adapted to identify a first range in which the least significant decimal digit will lie when one of said second binary coded groups is read out by said sensing means; said first code being a two-out-of-five binary code; said second code being a three-out-of-five code.

12. A meter for encoding a decimal reading of a quantity being measured wherein said decimal reading is at least two decimal digits in length; first and second means each mounted on rotatable shafts for digitizing the angular positions of the meter utilized to identify by a decimal number the quantity being measured; gear means for imparting rotation in a 1:10 ratio to one of said shafts in response to rotation of the other of said shafts; said first and second means each being comprised of a rotatable drum capable of assuming any angular position in a complete circle of rotation; said circle being divided into a plurality of discrete angular portions; first conductive means on the surface of said drum for generating a first plurality of binary coded signal groups wherein each one of said signal groups represents one of said discrete angular portions around said circle; second conductive means on said drum for identifying shaft angle positions which lie in the immediate region surrounding the adjacent ends of neighboring angular portions; said second conductive means cooperating with said first conductive means to generate a second plurality of binary coded signal groups to identify an angular shaft position in the immediate region of two adjacent angular portions; stationary sensing means making a wiping contact with the surface of said drum for reading out said binary coded signal groups; said second code group being adapted to identify a first range in which the least significant decimal digit will lie when one of said second binary coded groups is read out by said sensing means; said first code being a two-out-of-five binary code; said second code being a three-out-of-five code, third conductive means on said drum surface for generating a plurality of third binary coded signal groups to identify a second range in which the least significant decimal digit will lie when one of said second binary coded groups is read out by said sensing means, said second range being smaller than said first range; said third code being a four-out-of-six code.

13. A shaft angle encoder comprising first rotatable means capable of assuming any angular position in a complete circle of revolution, said circle being divided into a plurality of discrete angular portions; said first rotatable means comprising second means for generating a first plurality of binary coded signal groups, each of said signal groups representing one of said discrete angular positions making up said circle; third means on said first rotatable means for identifying shaft angle positions which lie in the immediate region surrounding the adjacent ends of neighboring angular portions, third means including fourth means for generating second binary coded signal groups which are adapted to be easily distinguishable from said first binary coded signal groups to identify an angular position in the immediate region of two adjacent angular portions; said second means and said third means comprising a plurality of substantially circular conductive means for generating said binary coded signal groups; means for electrically insulating said conductive means from one another.

References Cited in the file of this patent

UNITED STATES PATENTS

| | | |
|---|---|---|
| 2,764,344 | Wescott | Sept. 25, 1956 |
| 2,972,740 | Lahti | Feb. 21, 1961 |
| 3,022,500 | Stupar | Feb. 20, 1962 |

UNITED STATES PATENT OFFICE
CERTIFICATE OF CORRECTION

Patent No. 3,165,733                            January 12, 1965

Abraham Brothman et al.

It is hereby certified that error appears in the above numbered patent requiring correction and that the said Letters Patent should read as corrected below.

Column 4, lines 10 and 11, for "Serial Number 71,093, now Patent No. 3,096,932, entitled "Automated Meter Reading System," by" read -- Serial No. 91,043, now Patent No. 3,142,726 entitled "Automated Sequential Interrogation Meter Reading System Over Telephone Lines," by --.

Signed and sealed this 10th day of August 1965.

(SEAL)
Attest:

ERNEST W. SWIDER                                    EDWARD J. BRENNER
Attesting Officer                                         Commissioner of Patents